United States Patent
Tho

(10) Patent No.: US 8,833,536 B2
(45) Date of Patent: Sep. 16, 2014

(54) RATCHET MECHANISM FOR BICYCLE HUB

(75) Inventor: Kee Ping Tho, Jiangsu (CN)

(73) Assignee: Kunshan Henry Metal Technology Co., Ltd., Jiangsu (CN)

( * ) Notice: Subject to any disclaimer, the term of this patent is extended or adjusted under 35 U.S.C. 154(b) by 0 days.

(21) Appl. No.: 13/103,182

(22) Filed: May 9, 2011

(65) Prior Publication Data

US 2012/0285785 A1 Nov. 15, 2012

(51) Int. Cl.
*F16D 23/00* (2006.01)
*F16D 19/00* (2006.01)

(52) U.S. Cl.
USPC ...... 192/64; 192/84.3; 192/84.92; 192/109 R; 301/110.5

(58) Field of Classification Search
USPC ........................................ 192/64, 84.3, 84.92
See application file for complete search history.

(56) References Cited

U.S. PATENT DOCUMENTS

| 2002/0179394 A1* | 12/2002 | Wu | 192/64 |
| 2003/0042101 A1* | 3/2003 | Juan | 192/64 |
| 2009/0255774 A1* | 10/2009 | Hsu | 192/64 |

* cited by examiner

*Primary Examiner* — David D Le
*Assistant Examiner* — Colby M Hansen
(74) *Attorney, Agent, or Firm* — Rosenberg, Klein & Lee

(57) ABSTRACT

A ratchet mechanism of a bicycle hub includes a ring fixed in the hub. The ring has a tapered surface and a flange is formed in the inner periphery of the ring. A driving unit is located in the hub and has multiple first ratchet teeth extending axially therefrom. A passive unit is located in the tapered surface and corresponding to the driving unit. The passive unit has a passive seat which has a tapered outer face matched with the tapered surface. The passive seat further has a stop portion which is stopped by the flange in one direction. The passive seat has multiple second ratchet teeth engaged with the first ratchet teeth. A magnetic unit is located between the hub and the passive set, and two magnetic members which are magnetically repulsive to each other so as to linearly move the passive seat toward the driving portion.

7 Claims, 6 Drawing Sheets

RATCHET MECHANISM FOR BICYCLE HUB

FIELD OF THE INVENTION

The present invention relates to a ratchet mechanism, and more particularly, to a ratchet mechanism in a bicycle hub and the ratchet mechanism is cooperated with a magnet unit to generate automatic return function.

BACKGROUND OF THE INVENTION

A conventional bicycle hub is used for positioning the wheel axle so that the wheel is rotatable about the axle, and generally includes the hub, the axle, the rotatable unit and the ratchet disk. A driving unit and derailleur mechanism are cooperated with the hub when needed. The conventional hubs are cataloged by one-way driving and two-way driving, wherein the one-way driving means that the hub can only rotate in the specific direction which usually the forward direct of the bicycle, and the two-way driving hub means that the hub can be rotated in both directions.

The one-way driving hub uses ratchet teeth to drive the wheel in one direction and the ratchet teeth do not output mechanical work when driving in the other direction so that when the pedals are not treaded, the bicycle wheel still rotate for keep the bicycle moving forward. The engagement of the ratchet teeth of one-way driving bicycle hub can be engaged in radial direction or in axial direction. The radial-direction ratchet teeth extend radially from the hub and are engaged with the pawls in radial direction and the axial-direction ratchet teeth extend axially from the hub and are engaged with the pawls in axial direction.

Taiwan Utility Model Patent No. 099200755 discloses a bicycle hub and comprises a hub mounted to an axle and a recess is defined in one end of the hub. The recess includes multiple ratchet recesses defined therein. A ratchet member is rotatably mounted to the axle and includes a disk which has multiple notches. The disk is engaged with the recess and the notches are alternatively arranged into two groups, and any two adjacent notches are separated by one pitch. Each notch has a pawl which is biased by a spring.

Taiwan Utility Model Patent No. 096219287 discloses a bicycle hub and comprises a magnetic collar which has multiple teeth located around the center thereof and the teeth extend axially. A ring-shaped magnetic pawl which has two end faces, the outer end face is engaged with the teeth and movable in axial direction. A circular ratchet member is connected to the other end face of the ring-shaped magnetic pawl and is connected to a free wheel. The circular ratchet member is engaged with the ring-shaped magnetic pawl in one direction. More than on permanent magnet is connected to the ring-shaped magnetic pawl where no circular ratchet member is connected.

The Taiwan Utility Model Patent No. 099200755 discloses that any two adjacent notches are separated by one pitch and each notch has a pawl which is biased by a spring. When the cyclist pedals forward, the system chooses the pawl that is located close to the notch as the pushing pawl. Taiwan Utility Model Patent No. 096219287 discloses a circular ratchet member connected to the end face of the ring-shaped magnetic pawl and is engaged with the free wheel in one direction. The ring-shaped magnetic pawl and the circular ratchet member are made by magnetic material so that they are always located in the collar by the permanent magnet and in contact with the end surface of the free wheel to operate under small resistance.

The present invention intends to provide a ratchet mechanism for a bicycle hub and improves the drawbacks of the prior arts mentioned above, wherein the pawl and the ring-shaped member have larger contact surface which accelerates the wearing therebetween and the significant friction also slows the movement of the pawl which cannot quickly return to its original position.

SUMMARY OF THE INVENTION

The present invention relates to a ratchet mechanism of a bicycle hub and includes a ring fixed in the hub, wherein the ring has a tapered surface and a flange is formed in the inner periphery of the ring. A driving unit is located in the hub and has multiple first ratchet teeth extending axially therefrom. A passive unit is located in the tapered surface and corresponding to the driving unit. The passive unit has a passive seat which has a tapered outer face matched with the tapered surface. The passive seat further has a stop portion which is stopped by the flange in one direction. The passive seat has multiple second ratchet teeth engaged with the first ratchet teeth. A magnetic unit is located between the hub and the passive set, and two magnetic members which are magnetically repulsive to each other so as to linearly move the passive seat toward the driving portion. By the tapered surface and the tapered outer face, the friction between parts is reduced and the speed that the passive seat moves back and the sensitivity of the ratchet mechanism are enhanced.

The primary object of the present invention is to provide a ratchet mechanism for a bicycle hub, wherein the engagement between the passive seat and the ring, when the passive seat slightly disengaged from the status of engagement, a gap is generated between the passive seat and the tapered surface of the ring to achieve the purpose of reducing friction.

Another object of the present invention is to provide a ratchet mechanism for a bicycle hub, wherein the passive seat is mounted to the tapered surface of the ring so that the passive seat can be quickly responsive to the operation of the ratchet mechanism.

Yet another object of the present invention is to provide a ratchet mechanism for a bicycle hub, wherein there is a stop portion on the passive seat so as to be engaged with the ring, such that the passive seat can precisely return to desired position and does not hit the part cooperated therewith.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
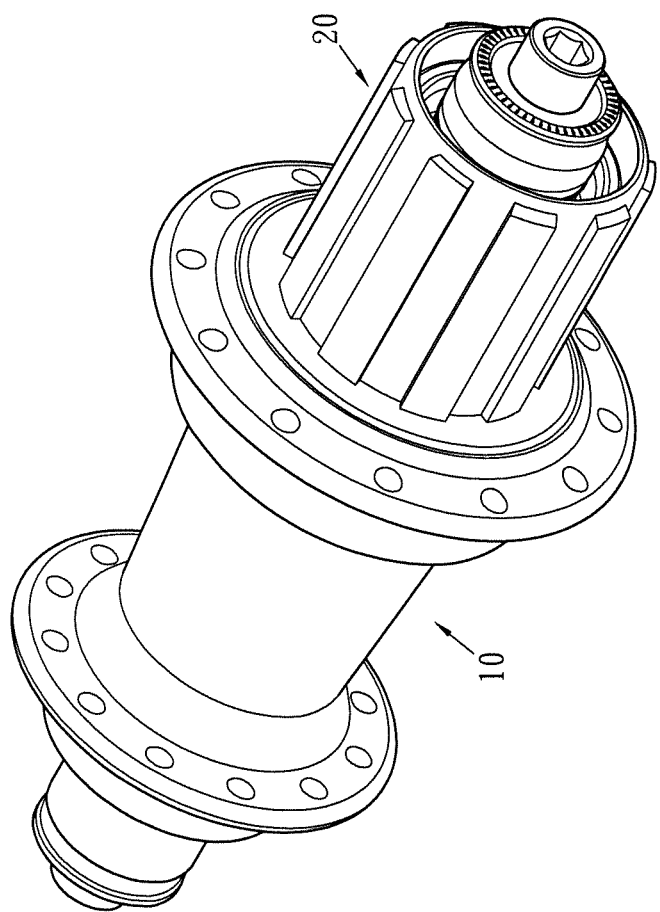
FIG. 1 is a perspective view to show the ratchet mechanism of the present invention.
Figure 2:
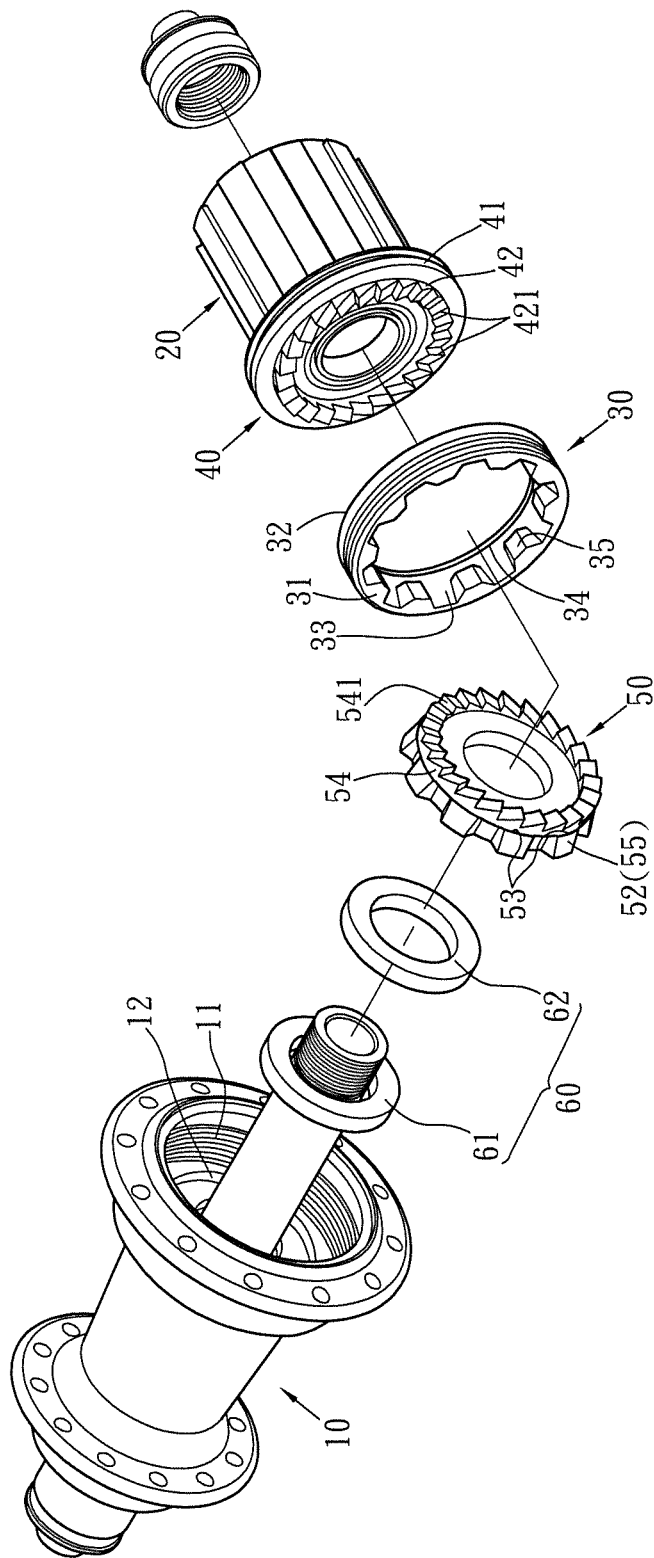
FIG. 2 is an exploded view to show the ratchet mechanism of the present invention.
Figure 3:
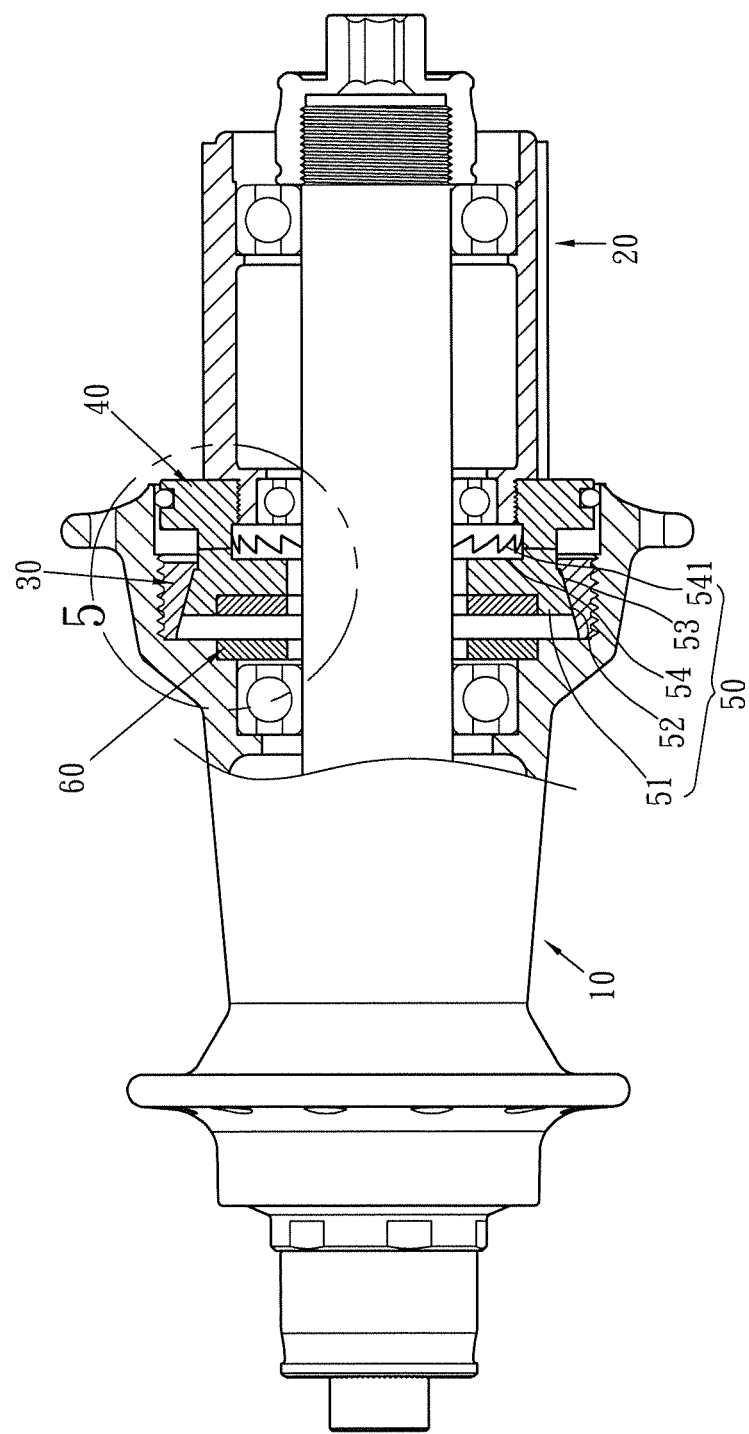
FIG. 3 is a cross sectional view of the ratchet mechanism of the present invention.

Referring to FIGS. 1 to 3, the ratchet mechanism of the present invention is located between a hub 10 and an engaging portion 20 which is connected to an end of the hub 10. The hub 10 has a ring 30 and a driving unit 40 received therein, wherein a passive unit 50 is engaged with the ring 30 and a magnetic unit 60 is located between the passive unit 50 and the hub 10.

The hub 10 is a hollow hub and a first recess 11 is defined in one end thereof and a second recess 12 is defined in an inner end of the first recess 11.

The engaging portion 20 is a hollow tube and a smaller connection portion 21 extends from one end of the engaging portion 20.

The ring 30 is threadedly connected to the first recess 11 and has a connection face 31 and a free face 32 on two opposite sides thereof. A tapered surface 33 is defined in the inner periphery of the ring 30, wherein the tapered surface 33 is tapered from the connection face 31 toward the free face 32. A flange 34 is formed in the inner periphery of the ring 30 and located on the tapered surface 33 and close to the free face 32. Multiple first transmission teeth 35 are located in the tapered surface 33.

The driving unit 40 is located between the hub 10 and the engaging portion 20. The driving unit 40 has a driving portion 41 threadedly connected to the connection portion 21 and the outer surface of the driving portion 41 is located in the hub 10. A first ratchet seat 42 is formed on a side of the driving portion 41 and has multiple first ratchet teeth 421 extending axially therefrom and toward the hub 10.

The passive unit 50 is located in the tapered surface 33 and corresponding to the driving unit 40. The passive unit 50 is movable along the tapered surface 33 and has a passive seat 51 which has a tapered outer face 52 matched with the tapered surface 33. The passive seat 51 has a stop portion 53 which is stopped by the flange 34 in one direction. The passive seat 51 has a second ratchet seat 54 on a side thereof which faces the driving portion 41. The second ratchet seat 54 has multiple second ratchet teeth 541 engaged with the first ratchet teeth 421. The tapered outer face 52 further has multiple second transmission teeth 55 which are engaged with the first transmission teeth 35.

The magnetic unit 60 is located between the hub 10 and the passive set 51. The magnetic unit 60 has a first magnetic member 61 in the second recess 12 of the hub 10 and a second magnetic member 62 on an end surface of the passive seat 51. The end surface of the passive seat 51 is located corresponding to the first recess 11. The first and second magnetic members 61, 62 are magnetically repulsive to each other so as to linearly move the passive seat 51 toward the driving portion 41.

The magnetic unit 60 pushes the passive unit 50 so as to move the passive seat 51, the second ratchet seat 54 and the second magnetic member 62 synchronically and linearly in the tapered surface 33. By the engagement of the tapered surfaces between the passive seat 51 and the ring 30, when the passive seat 51 slightly disengaged from the status of engagement, a gap is generated between the passive seat 51 and the tapered surface 33 of the ring 30 to achieve the purpose of reducing friction. The passive seat 51 can quickly responsive to the engaging and disengaging actions, and the passive seat 51 can quickly move back to its original position and the ratchet mechanism is more sensitive and efficient.

The first and second ratchet seats 42, 54 and the first and second ratchet teeth 421, 541 are integrally formed on the driving portion 41 and the passive seat 51. The first magnetic member 61 is connected to the second recess 12 and the second magnetic member 62 is located on the end surface of the passive seat 51. The passive seat 51 is engaged with the tapered surface 33 which is matched with the tapered outer face 52. The ring 30 is threadedly connected in the first recess 11 and the connection portion 21 is threadedly connected in the driving portion 41. The first ratchet teeth 421 are engaged with the first recess 11 to allow the first and second ratchet teeth 421, 541 to be engaged with each other.

Figure 4:
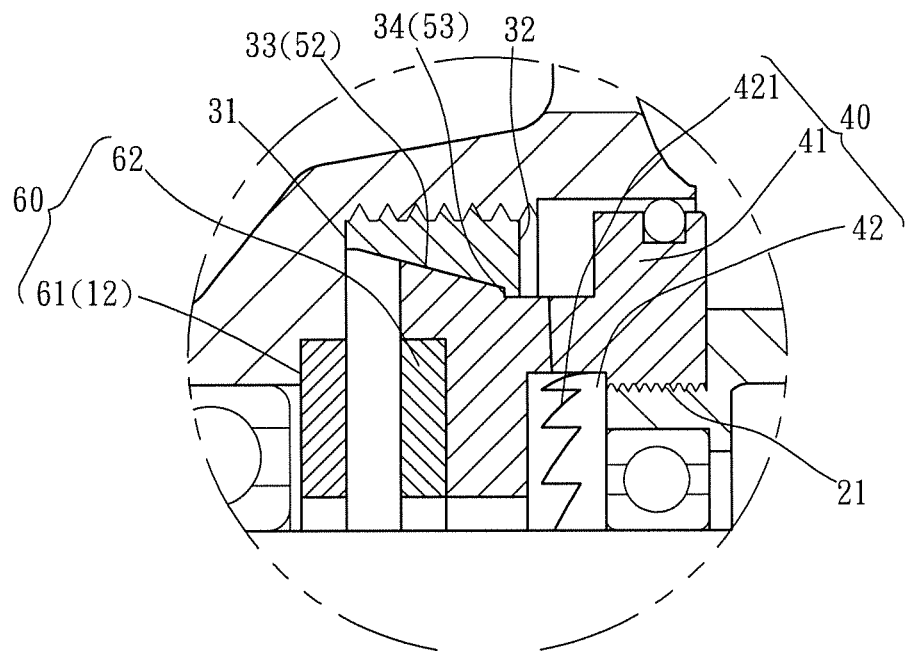
FIG. 4 is an enlarged cross sectional view of the circled portion in FIG. 3.

As shown in FIGS. 3 and 4, when the hub 10 is rotated in the direction that outputs work, the forward direction of the bicycle, because the first and second magnetic members 61, 62 are magnetically repulsive to each other so that the passive seat 51 moves linearly toward the driving portion 41, and the two respective ends of the passive seat 51 and the driving portion 41 are in contact with each other, and the first and second ratchet teeth 421, 541 are engaged with each other.

Figure 6:
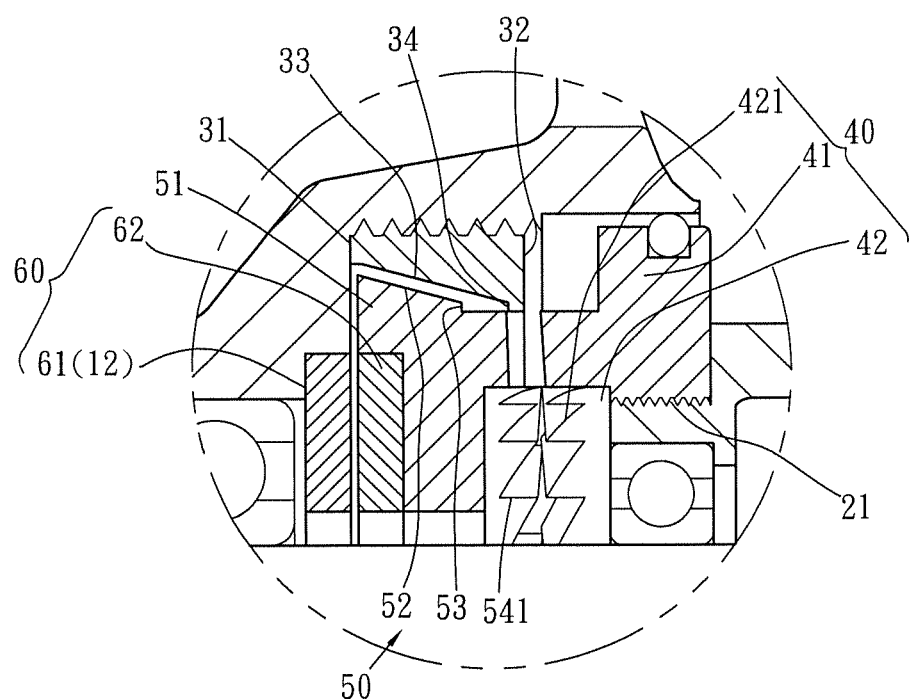
FIG. 6 is an enlarged cross sectional view of the circled portion in FIG. 5.
Figure 5:
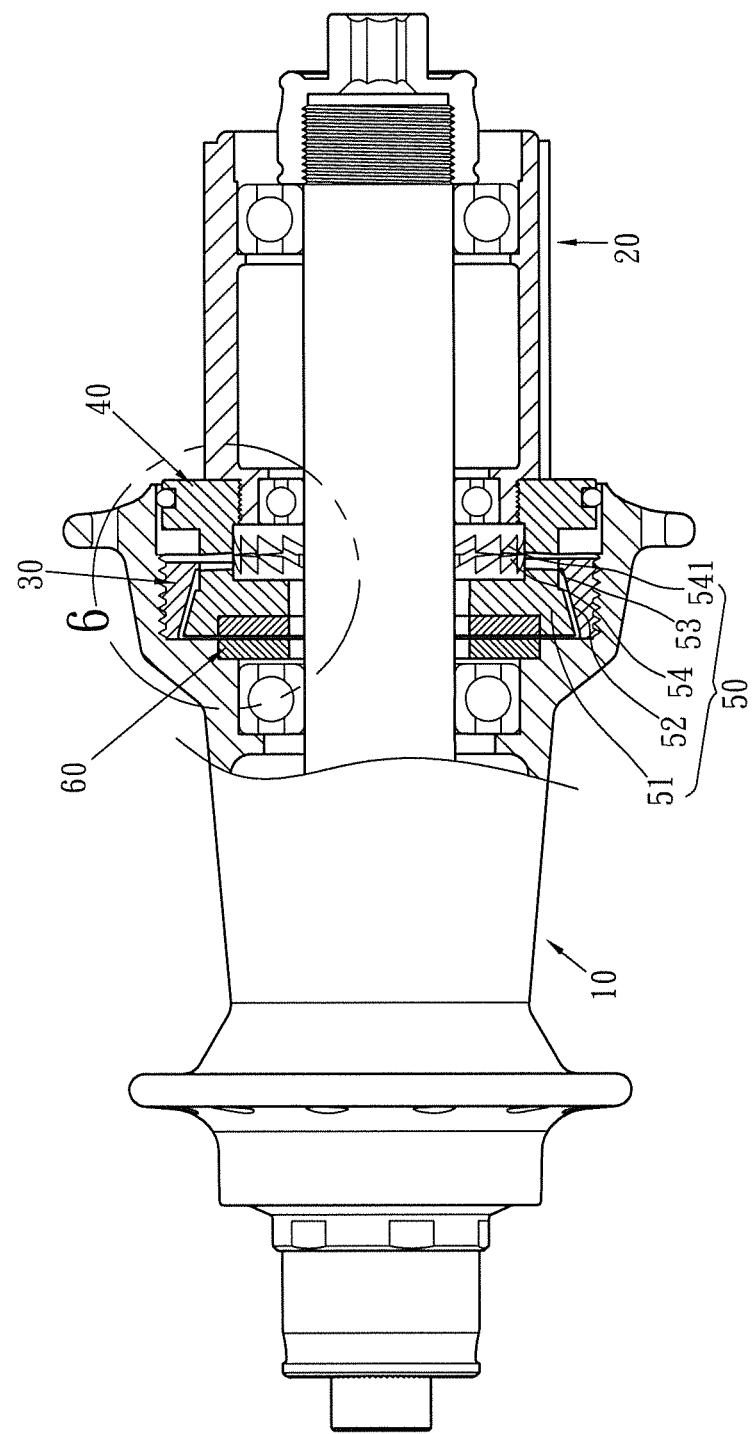
FIG. 5 is a partial cross sectional view of the ratchet mechanism of the present invention.

As shown in FIGS. 5 and 6, when the hub 10 is rotated in the direction that does not output work, the first ratchet teeth 421 push the second ratchet teeth 541 away.

The first ratchet seat 42, the passive seat 51 and the second magnetic member 62 move toward the first magnetic member 61, so that a gap is generated between the tapered surface 33 and the tapered outer face 52. The hub is rotated while no work is output.

Figure 7:
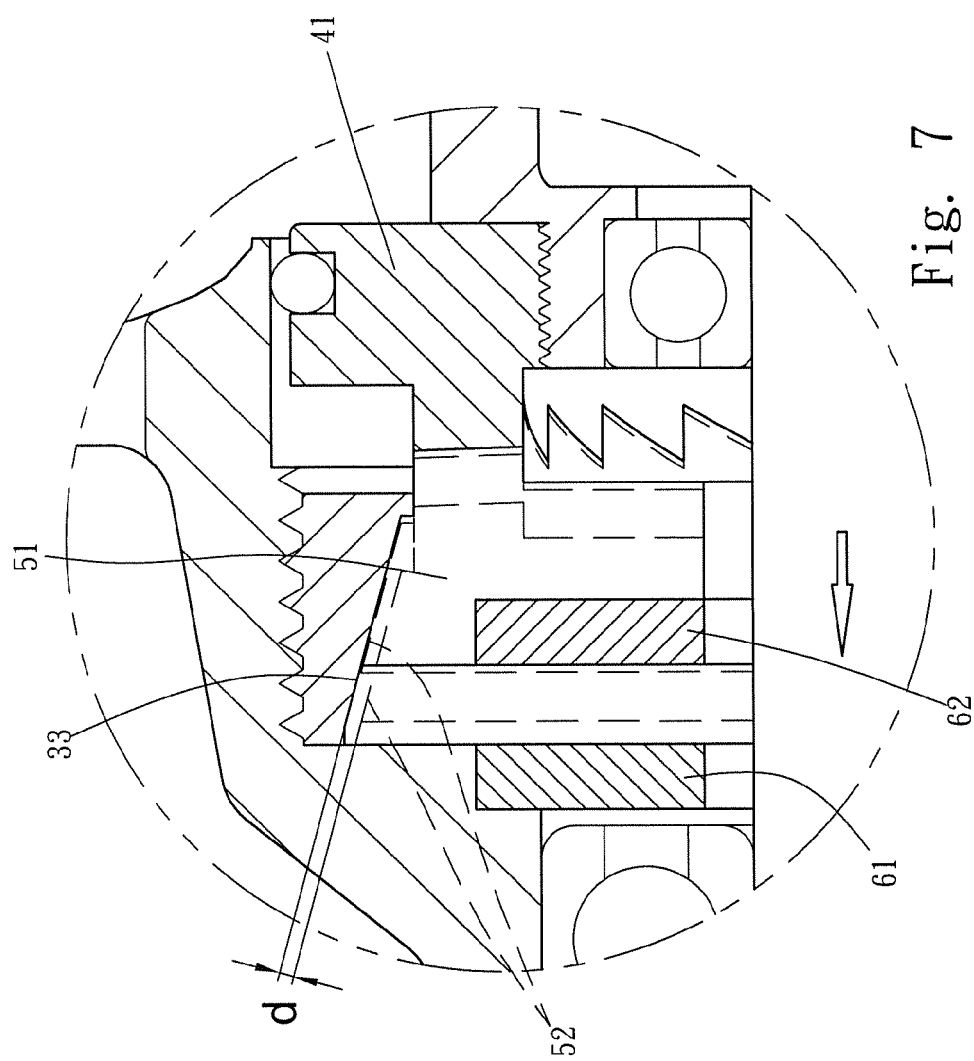
FIG. 7 is another enlarged cross sectional view of the circled portion in FIG. 5.

Referring to FIG. 7, when the second ratchet teeth 541 are slightly disengaged from the first ratchet teeth 421, the passive seat 51 moves toward the first magnetic member 61 a small distance, a gap "d" is defined between the tapered surface 33 and the tapered outer face 52 which is not in contact with the tapered surface 33. The distance "d" becomes larger along with the distance that the passive seat 51 moves.

By the engagement between the tapered outer face 52 of the passive seat 51 and the tapered surface 33 of the ring 30, when the passive seat 51 is slightly disengaged from the ring 30, the gap "d" is generated, so that there will be no friction for the tapered outer face 52. Furthermore, before the first and second ratchet teeth 421, 541 are engaged and the passive seat 51 returns to the linear movement, there is no friction between the tapered outer face 52 and the tapered surface 33. Although there is friction between the two sides of the first transmission teeth 35 because of rotation, the friction applied to the surface of the first transmission teeth 35 from the tapered outer face 52 is excluded.

The passive seat 51 is movable within the ring 30 with small friction, the passive seat 51 moves quickly between engaging and disengaging actions and the ratchet mechanism is operated more sensitively.

The movement of the passive seat 51 is stopped by the cooperation between the flange 34 and the stop portion 53 when the passive seat 51 is moved by the magnetic unit 60 toward the driving portion 41, so that the passive seat 51 is not overly moved. In order to control the magnetic force between the first and second magnetic members and to avoid impact to the driving portion 41 by the movement of the passive seat 51 and the impact to the first ratchet teeth 421 by the second ratchet teeth 541, the cooperation between the flange 34 and the stop portion 53 effectively restricts the passive seat 51 from overly moving and hitting the driving portion 41. The passive seat 51 returns precisely to ensure that the first and second ratchet teeth 421, 541 are engaged with each other as desired.

While we have shown and described the embodiment in accordance with the present invention, it should be clear to those skilled in the art that further embodiments may be made without departing from the scope of the present invention.

What is claimed is:

1. A ratchet mechanism for a bicycle hub, comprising:
a hub;
an engaging portion connected to an end of the hub;
a ring fixed in the hub and having a tapered surface defined in an inner periphery thereof, a flange formed in the inner periphery of the ring;
a driving unit located between the hub and the engaging portion, the driving unit having a driving portion, a first ratchet seat formed on a side of the driving portion and having multiple first ratchet teeth extending axially therefrom, and
a passive unit located in the tapered surface and corresponding to the driving unit, the passive unit being movable along the tapered surface and having a passive seat which has a tapered outer face matched with the tapered surface, the passive seat having a stop portion which is stopped by the flange, the passive seat having a second ratchet seat on a side thereof which faces the driving portion, the second ratchet seat having multiple second ratchet teeth engaged with the first ratchet teeth.

2. The ratchet mechanism as claimed in claim 1, wherein the ring has a connection face and a free face on two opposite sides thereof, the tapered surface is tapered from the connection face toward the free face, the flange is located on the tapered surface and close to the free face.

3. The ratchet mechanism as claimed in claim 1, wherein the driving portion is fixed to the engaging portion and an outer surface of the driving portion is located within the hub.

4. The ratchet mechanism as claimed in claim 1, wherein a magnetic unit is located between the hub and the passive set, the magnetic unit has a first magnetic member in the hub and a second magnetic member on the passive seat, the first and second magnetic members are magnetically repulsive to each other so as to linearly move the passive seat toward the driving portion.

5. The ratchet mechanism as claimed in claim 4, wherein the first magnetic member is located at a lower portion in an inside of the hub and the second magnetic member is located on the end surface of the passive seat and located corresponding to the first magnetic member.

6. The ratchet mechanism as claimed in claim 4, wherein multiple first transmission teeth are located in the tapered surface and the tapered outer face has multiple second transmission teeth which are engaged with the first transmission teeth.

7. The ratchet mechanism as claimed in claim 4, wherein the passive seat, the second ratchet seat and the second magnetic member are synchronically and linearly movable in the tapered surface.

* * * * *